(12) United States Patent
Kurtz et al.

(10) Patent No.: US 6,595,066 B1
(45) Date of Patent: Jul. 22, 2003

(54) STOPPED LEADLESS DIFFERENTIAL SENSOR

(75) Inventors: Anthony D. Kurtz, Ridgewood, NJ (US); Alexander A. Ned, Wayne, NJ (US)

(73) Assignee: Kulite Semiconductor Products, Inc., Leonia, NJ (US)

( * ) Notice: Subject to any disclaimer, the term of this patent is extended or adjusted under 35 U.S.C. 154(b) by 0 days.

(21) Appl. No.: 10/117,719

(22) Filed: Apr. 5, 2002

(51) Int. Cl.$^7$ ................................................. G01L 9/06
(52) U.S. Cl. ............................. 73/721; 73/715; 73/719; 73/720; 338/42
(58) Field of Search ........................ 73/708, 715, 716, 73/717, 718, 719, 720, 721, 722, 727, 756, 709, 726; 338/42

(56) References Cited

U.S. PATENT DOCUMENTS

| | | | |
|---|---|---|---|
| 5,973,590 A | 10/1999 | Kurtz et al. ................. 338/42 |
| 6,210,989 B1 | 4/2001 | Kurtz et al. ................. 438/51 |
| 6,272,928 B1 | 8/2001 | Kurtz ........................... 73/721 |
| 6,272,929 B1 | 8/2001 | Kurtz et al. ................. 73/727 |
| 6,311,561 B1 * | 11/2001 | Bang et al. ................... 73/708 |

* cited by examiner

*Primary Examiner*—Edward Lefkowitz
*Assistant Examiner*—Alandra Ellington
(74) *Attorney, Agent, or Firm*—Duane Morris, LLP

(57) ABSTRACT

A leadless sensor of the type employing a p+ rim which surrounds contact areas, each contact area defined by a metallized portion surrounded by a p+ semiconductor material, which p+ semiconductor materials or fingers are coupled to an active sensor array. The leadless sensor is bonded to a first glass cover member having two slotted apertures which communicate with the active regions of the sensor area on the underside and a top glass contact member which has two slotted regions which communicate with the piezoresistive sensors on the top side of the semiconductor wafer. The glass contact member has a series of corner through holes which are congruent with the contact terminals associated with the semiconductor sensor and which through holes are filled with a glass metal frit to enable contact to be made to the contact terminals of the semiconductor sensor. The contact glass member and cover member are electrostatically bonded to the silicon sensor at both sides of the sensor and have stop structures on both members to enable the sensor to receive a force or pressure in either direction. If the force in either direction exceeds a predetermined force, the silicon sensor will impinge against the surface of the stop area to limit the force and therefore prevent damage to the sensor. The sensor behaves as a differential sensor in operation where the Wheatstone Bridge sensor array provides a difference between the force applied to the top side of the sensor with respect to the force applied to the bottom side of the sensor.

10 Claims, 6 Drawing Sheets

STOPPED LEADLESS DIFFERENTIAL SENSOR

RELATED APPLICATIONS

This application is related to Ser. No. 10/057,130 filed on Oct. 24, 2001 entitled, "Double Stop Structure for a Pressure Transducer" by A. D. Kurtz et al. and assigned to the assignee herein and is incorporated herein in its entirety.

FIELD OF INVENTION

This invention relates to piezoresistive sensors, and more particularly, to a stopped leadless differential pressure sensor.

BACKGROUND OF THE INVENTION

As indicated, the above-noted application entitled, "Double Stop Structure for a Pressure Transducer" depicts the problem of utilizing stops on a differential pressure transducer. A differential pressure transducer is a device which provides an output which is the difference between two input pressures. For example, when a pressure $P_1$ is applied to one phase of the deflecting member and a pressure $P_2$ is applied to the other face of the deflecting member, the resulting deflection will be determined by the difference in pressure, as for example for example, $P_1$ minus $P_2$. An example of differential piezoresistive bridge pressure transducers is illustrated in U.S. Pat. No. 6,272,928 entitled, "Hermetically Sealed Absolute and Differential Pressure Transducers" assigned to the assignee herein. In any event, the above-noted application describes the problems and the need for a stop structure that provides improved stopping capabilities, while ensuring adequate pressure application to the sensor structure. As one can ascertain, there remains a need for a stop structure that provides apertures that are large enough to ensure adequate pressure application, while providing apertures that are small enough to ensure the best stopping. There has also been improved pressure transducers, which are now in widespread use and which need to be stopped in both directions as employed in a differential pressure configuration.

The improvement of semiconductor transducers has increased and there is a series of transducers which have been innovated by the assignee herein and referred to as leadless transducers. See for example, U.S. Pat. No. 5,973,590 which issued on Oct. 26, 1999 entitled, "Ultra Thin Surface Mount Wafer Sensor Structure and Methods of Fabricating the Same" to A. D. Kurtz et al. and is assigned to the assignee herein. See also U.S. Pat. No. 6,210,989 which issued on Apr. 3, 2001 entitled, "Ultra Thin Surface Mount Wafer Sensor Structures and Methods of Fabricating the Same" issued to A. D. Kurtz et al. and is assigned to the assignee herein. See also, U.S. Pat. No. 6,272,929 entitled, "High Pressure Piezoresistive Transducer Suitable for Use in Hostile Environments" which issued on Oct. 14, 2001 to A. D. Kurtz et al. and is assigned to the assignee herein.

Essentially, such an ultra thin surface mount or leadless transducer is a semiconductor sensor device including a semiconductor diaphragm member having a top surface coated with an oxide layer. P+ sensor elements are fusion bonded to the oxide layer at a relatively central area of the diaphragm. P+ finger elements are fusion bonded to the oxide layer and extend from the sensors to an outer contact location of the diaphragm for each finger. There is an external rim of P+ material fusion bonded to the oxide layer surrounding the sensors and fingers. A first glass wafer member is electrostatically bonded at a bottom surface to the fingers and rim to hermetically seal the sensor and fingers of the diaphragm member. The first glass wafer includes a depression above the sensors and has a plurality of apertures, where each aperture is associated with a separate finger at a contact location. Each aperture is smaller than the associated finger, which is aligned with the contact location. Each contact location can therefore be accessed via the associated aperture and the first glass member. A second glass wafer member is secured to the top surface of the first glass wafer and has a plurality of apertures aligned with the plurality of apertures of the first glass wafer member and containing a group of hermetically sealed pins for coupling to the contact locations. Essentially, it is an object of the present invention to utilize the transducer structure shown in the above-noted references as a stopped leadless differential sensor where the leadless sensor is stopped in both directions.

SUMMARY OF INVENTION

A leadless sensor of the type employing a p+ rim which surrounds contact areas, each contact area defined by a metallized portion surrounded by a p+ semiconductor material, which p+ semiconductor materials are coupled to an active sensor array. The leadless sensor is bonded to a first cover member having two slotted apertures which communicate with the active regions of the sensor area on the underside and a top contact member which has two slotted regions which communicate with the piezoresistive sensors on the top side of the semiconductor wafer. The contact member has a series of through holes which are congruent with the contact terminals associated with the semiconductor sensor and which through holes are filled with a glass metal frit to enable contact to be made to the contact terminals of the semiconductor sensor. The contact glass member and cover member are electrostatically bonded to the silicon sensor at both sides of the sensor and have stop structures on both members to enable the sensor to receive a force or pressure in either direction. If the force in either direction exceeds a predetermined force, the silicon sensor will impinge against the surface of the stop area to limit the force and therefore prevent damage to the sensor. The sensor behaves as a differential sensor in operation where the Wheatstone Bridge sensor array provides a difference between the force applied to the top side of the sensor with respect to the force applied to the bottom side of the sensor.

BRIEF DESCRIPTION OF THE FIGURES

FIG. 3 consists of FIGS. 3A and 3B.

FIG. 4 consists of FIGS. 4A and FIG. 4B. FIG. 4A is a cross sectional view of a cover member fabricated from glass, while FIG. 4B is a top plan view of the cover member depicted in FIG. 4A.

FIG. 5 consists of FIGS. 5A, 5B and 5C. FIG. 5B depicts the semiconductor sensor structure, while

DETAILED DESCRIPTION OF THE FIGURES

Figure 1:
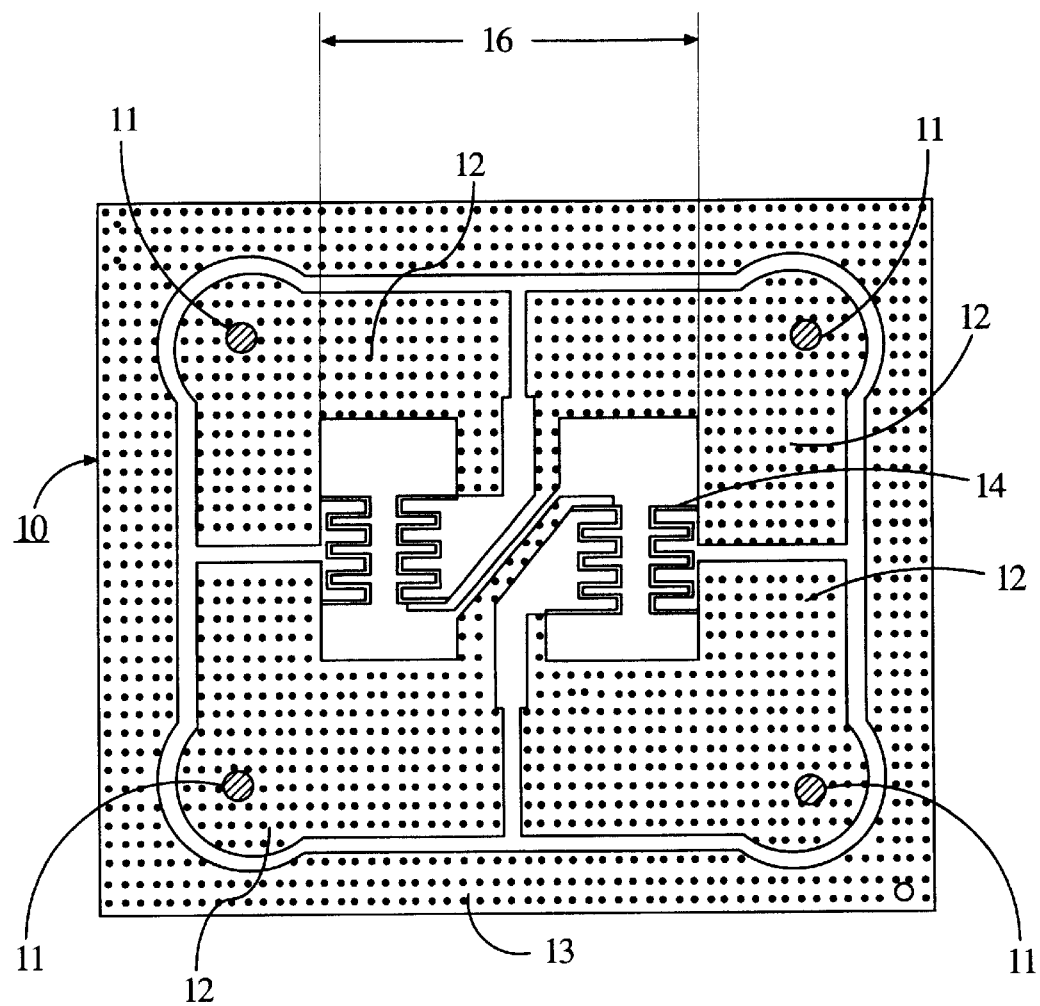
FIG. 1 is a top plan view of a semiconductor sensor of a leadless type employed in this invention.

Referring to FIG. 1, there is shown a top plan view of a semiconductor transducer or sensor 10 employed in this invention. The pressure sensor 10 is approximately 100 mils by 100 mils and is fabricated from two or more semiconductor wafers of silicon, or any other suitable wafer material. The transducer or sensor 10 is fabricated using conventional wafer processing techniques, which enable a number of dielectrically isolated piezoresistive elements such as 14, composed of a highly doped (P+) silicon to be formed on a semiconductor material using dielectric films of silicon dioxide ($SiO_2$) or the like. It is understood that a number of sensors can be made at the same time on a large wafer. Each sensor element 14 is essentially a variable resistor and forms one of four legs of a Wheatstone Bridge with each of the respective resistances varying in proportion to an applied force or pressure applied to the sensor or transducer structure 10. The circuit nodes of the Wheatstone bridge consist of four oversized p+ diffused silicon or electrical contact or fingers 12 which are mainly located in the non-active areas of the transducer 10. The term finger is used to indicate that the areas 12 project from the piezoresistors 14 to the metal contacts 11. The metal contacts 11 within the contact area are circular in shape and each is approximately 10 mils in diameter. Each contact 11 includes a centrally localized area of high temperature platinum titanium metallization. The transducer is further characterized by having an outer rim 13 which is a peripheral rim and which is fabricated from p+ material. The inner sectional fingers 12 are also fabricated from p+ material.

Figure 2:
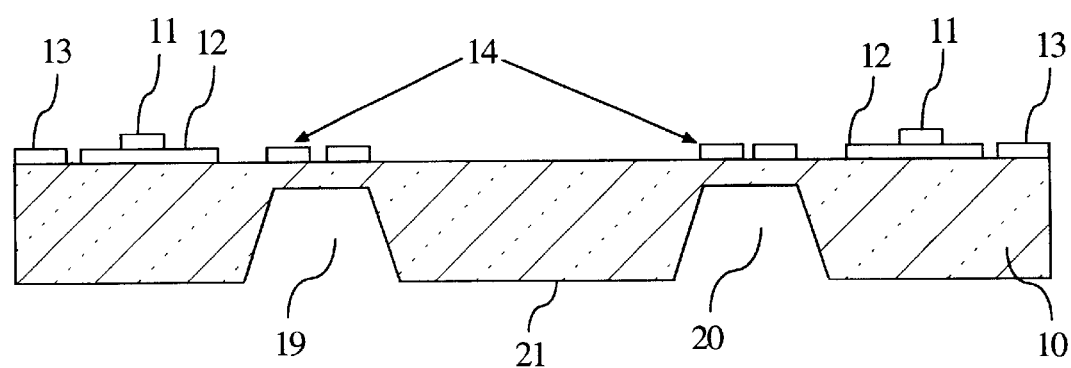
FIG. 2 is a cross sectional view of the sensor depicted in FIG. 1.

In FIG. 2 is a cross sectional view of the sensor 10 with the same reference numerals depicting the same structures. As one can also ascertain from FIG. 2, underneath the active region 16 of FIG. 1 are two thin areas or webs 19 and 20. The thin areas define the deflectable areas upon which the sensor structures 14 are located.

Also shown in FIG. 1 is an isolation moat 15, which basically runs about the periphery of the transducer, separating the rim 13 from the contact areas or fingers 12.

Figure 3B:
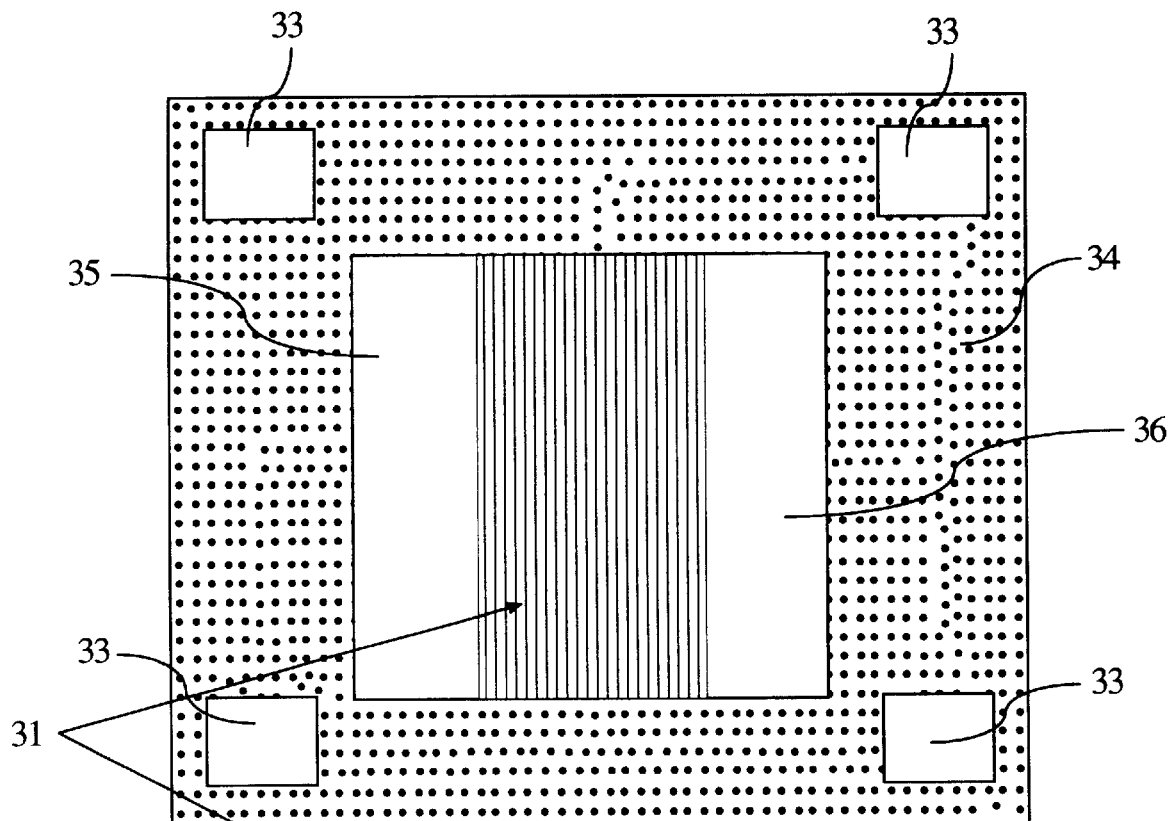
FIG. 3B is a top plan view of the contact glass depicted in cross sectional view of FIG. 3A.
Figure 3A:
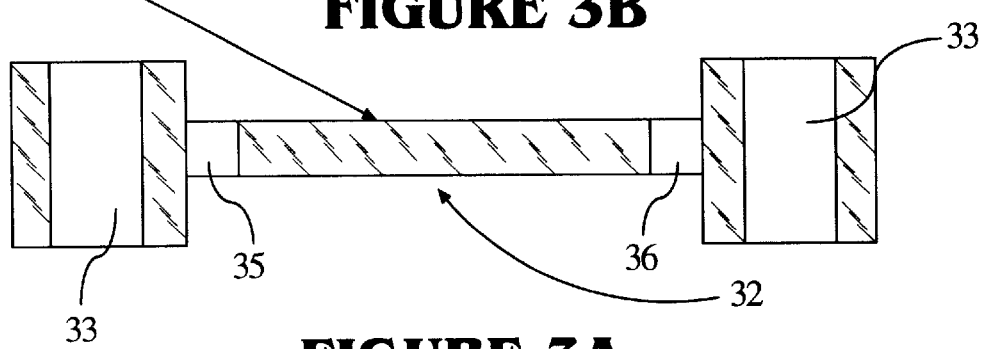
FIG. 3A is a cross sectional view of a contact glass with through holes, including a stop cavity.

Referring to FIG. 3 there is shown a contact glass cover member 34 with corner through holes 33 and a stop cavity 31. As seen from the top view of FIG. 3B, the contact glass member has four through holes 33, which essentially are aligned with the contact areas 11 of FIG. 1. The through holes 33 enable wires or other conductive materials to be deposited and make contact with the contact areas 11 on the sensor 10. Also shown are rectangular through holes 35 and 36, which essentially communicate with the active area of the sensor 10 and allow pressure to be applied to the piezoresistors 14. There is shown a center stop member 31, located between the through holes 35 and 36. Member 31 is positioned so that there is a top depression and a bottom depression 32.

Figures 4A, 4B:
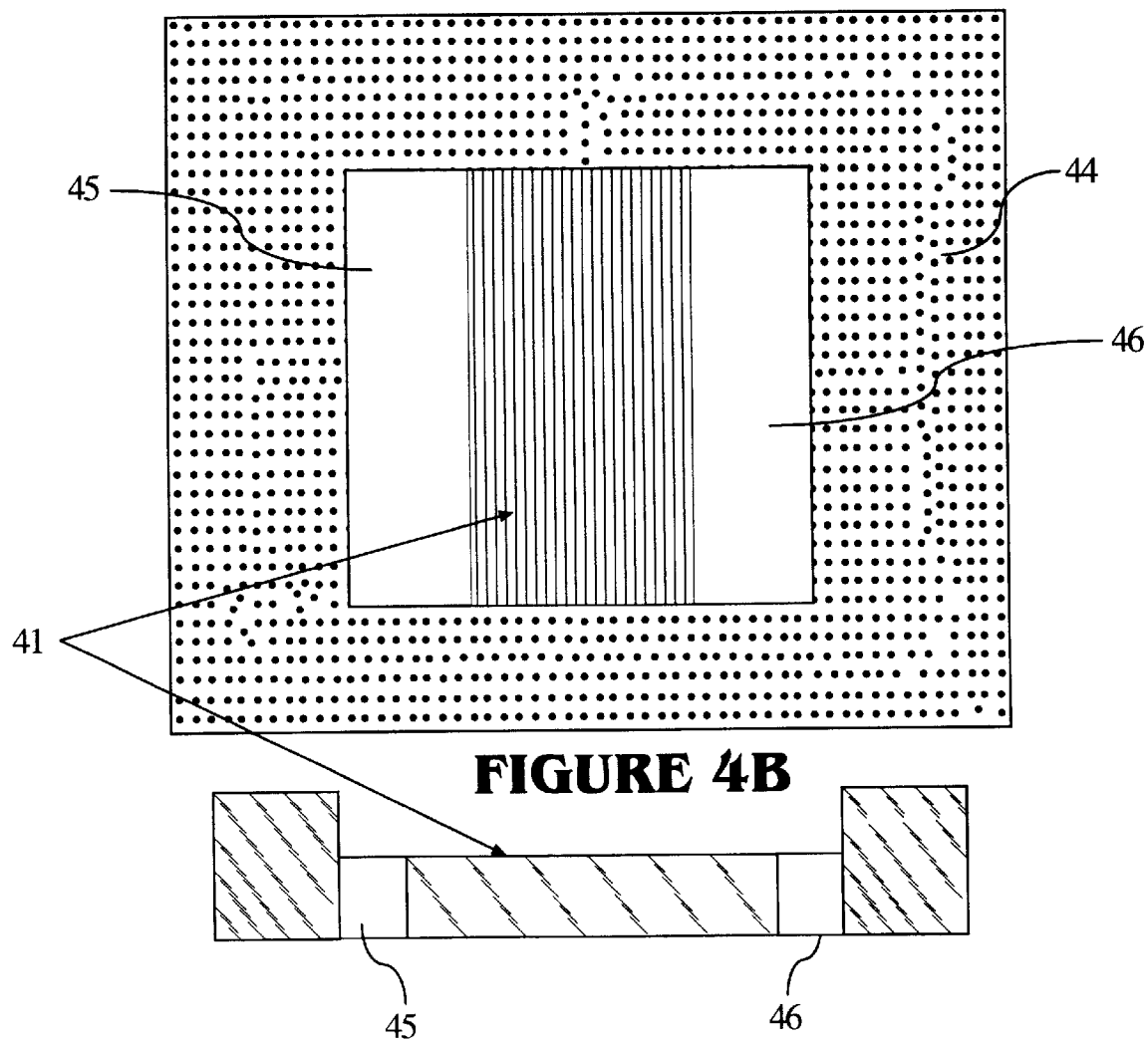

Referring to FIG. 4, there is shown a top plan view in FIG. 4B and a cross sectional view in FIG. 4A of a cover 44 with a stop cavity and pressure through holes 45 and 46. Again, the through holes 45 and 46 are rectangular in shape and enable a pressure to be applied to the bottom side of the sensor or transducer 10. The stop cavity 41 is essentially depressed with respect to the peripheral area of the glass structure and essentially has the same configuration as the stop member described in conjunction with the above-noted application entitled, "Double Stop Structure for a Pressure Transducer", Ser. No. 10/057,130 and filed on Oct. 24, 2001. As one can ascertain, the double stop, as indicated in the above-noted application, is similar in many respects to the present stop, with the exception that the contacts and contact areas of the transducers are different. The above-noted co-pending application, of course, is extremely pertinent to the present application. Both the contact glass cover member 34 and glass cover 44 are fabricated from a borosilicate glass.

Figure 5A:
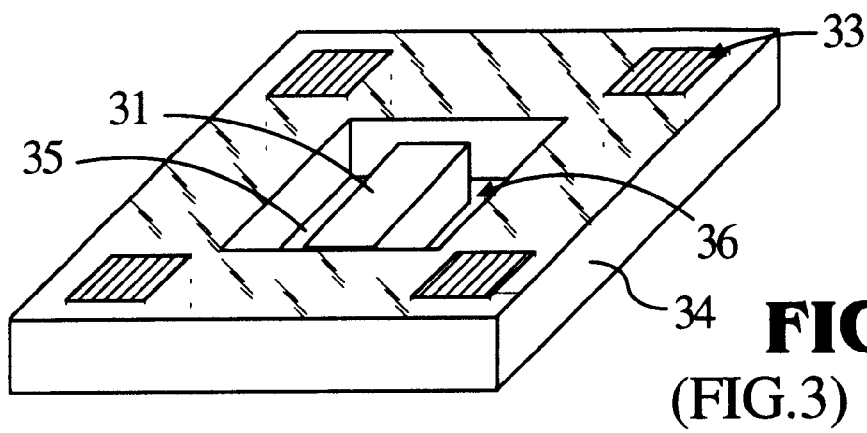
FIG. 5A depicts the contact glass member.
Figure 5B:
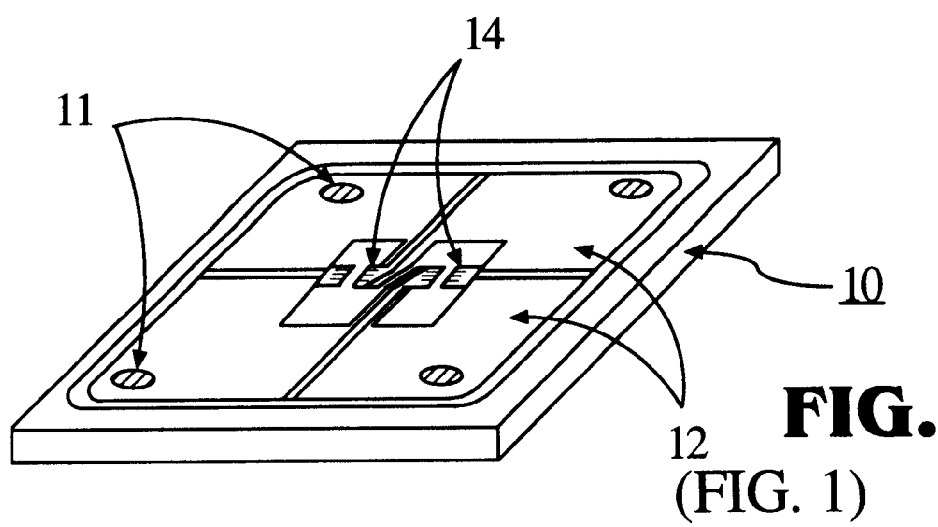
Figure 5C:
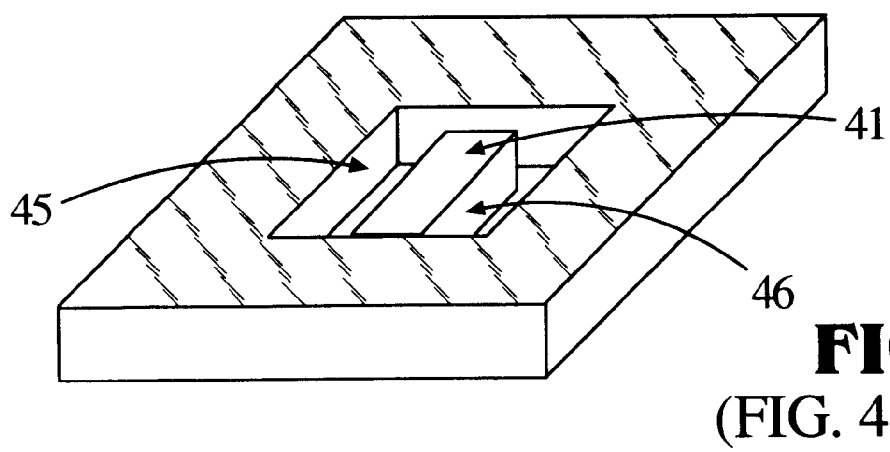
FIG. 5C depicts the cover glass member. The units depicted will be bonded together.

Referring to FIG. 5, there is shown FIG. 5A the cover member 34 depicted in FIG. 3, FIG. 5B depicts the sensor integrated circuit 10 depicted in FIG. 1 and FIG. 5C depicts the cover 44 shown in FIG. 4. In FIG. 5A the member 34 is shown with the through apertures 35 and 36 which communicate with the piezoresistors 14 of the semiconductor sensor 10. The sensor 10 is shown in FIG. 5B and also depicted in detail in FIG. 1. FIG. 5C shows the cover member 44 with the pressure apertures 45 and 46, which as will be explained communicate with the piezoresistors 14 located on the chip 10 and basically communicate with webs 19 an FIG. 2.

The entire sensor structure depicted herein consists of the contact glass member 34, the silicon sensor member 10 and the cover member 44. The cover glass member 44 of FIG. 5C is sealed to the non-sensing side of the silicon chip 10. The non-sensing side of the silicon chip contains a boss. The cover glass member has pressure slots 45 and 46, which extend through the member 44 and which are aligned with the webs as 19 and 20 of the silicon sensor member 10. There is also a small depression 41 in the central region of the cover glass (about 0.1 to 0.2 mils) which corresponds to the position of the boss 21 (FIG. 2) of the silicon sensor. The slots 45 and 46 permit the pressure media to impinge upon the webs 19 and 20 causing deflection. If the pressure media is applied to the non-boss side of the silicon sensor, the depression in the central region of the cover glass acts as a stop for deflection caused by pressure applied to the active side of the silicon sensor, which is the top side containing the sensors 14. The thickness of the cover glass member 44 is typically 0.01 inches to 0.02 inches. The silicon member 10 is typically on the order of 0.003 inches to 0.02 inches thick and is fabricated as described in the above-noted patents. In fabricating the sensor, there is a dielectrically isolating oxide to which the p+ structure containing the rim 13, the contact areas 12 and the piezoresistive network 14 is affixed using fusion bonding. Within the four contact regions there are the metallized areas 11, to which the metallized glass frit will be attached. The contact glass shown in FIG. 3 is similar to the cover glass shown in FIG. 4, which is typically of a thickness of 0.01 inches to 0.02 inches. There are four through apertures 33, which essentially are congruent with the metallized contact regions 11 of the silicon wafer 10. This is shown clearly in FIG. 5A.

The glass wafer also contains slotted apertures 35 and 36, which are congruent with the piezoresistive sensor network 14 and has a shallow depression 31 of 0.1 to 0.2 mils in depth lying inside the two-slotted apertures. On the reverse side of the contact glass, congruent with the depression of the other side, there is provided a deeper cavity of a depth of 2 to 3 mils which intersect the slotted through apertures. This is clearly depicted in FIG. 3A. To fabricate the sensor, the contact glass shown in FIG. 5A is first sealed to the p+ side of the silicon wafer using electrostatic bonding. The seal is made through bonding the bottom side to the external rim 13 of a wafer 10. The cover glass member 44 is sealed to the opposite side of the silicon wafer 10 also using electrostatic bonding. The contacts 33 of the contact glass cover member 34 are filled with a glass metal frit and fired to provide conducting areas.

Figure 8A:
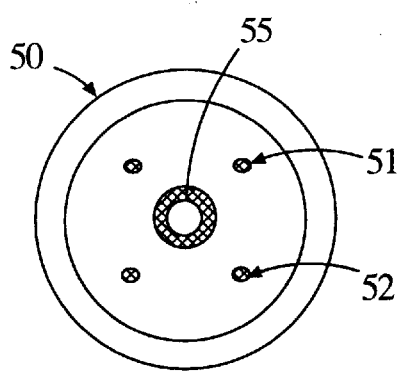
FIG. 8 consists of FIGS. 8A, 8B and 8C showing the sensor structure according to this invention bonded to a suitable header.
Figure 8B:
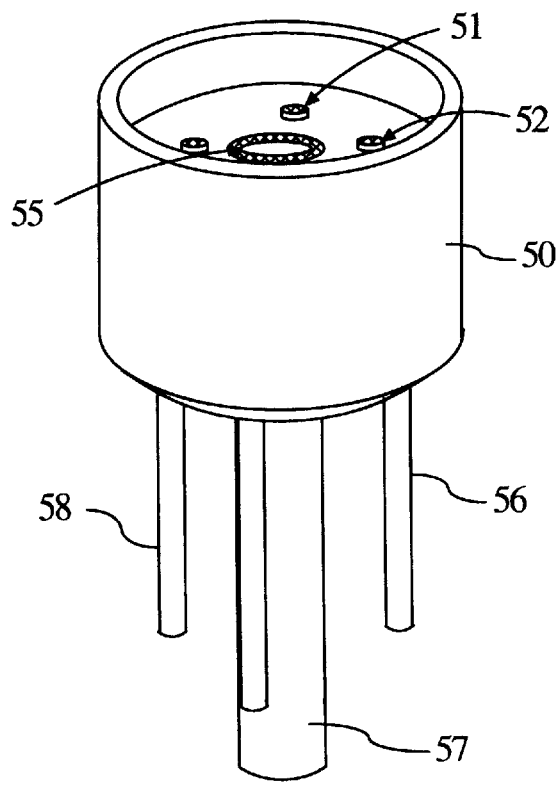
Figure 8C:
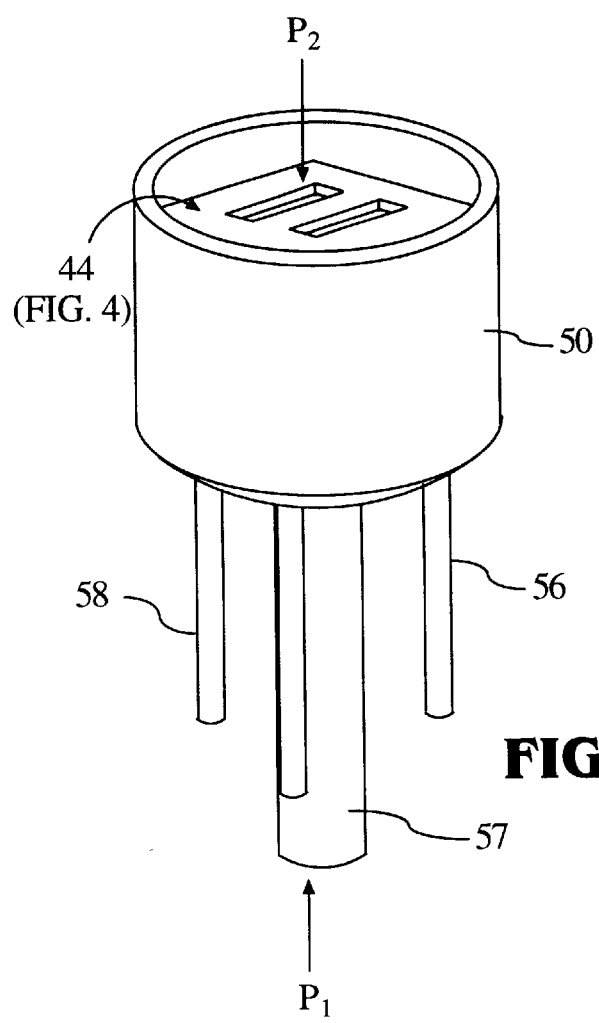

Referring to FIG. 8, the sensor will be mounted to a header 50. There it is shown a top plan view of the header 50 in FIG. 8A. The header 50 includes contacts 51 and 52 with a central port area 55 for receiving a pressure. The contacts as 51 and 52 are connected to pins 56 and 58, with the port area 55 connected to pressure tube 57. The surface of the header is first coated with a layer of about 0.001 inch to 0.003 inches of a ceramic such as Pyroceram, except in the areas immediately adjacent to the pin contacts 51 and 52 which project from the surface of the header about 0.003 inches to 0.010 inches. This is shown more clearly in FIG. 8B where the pin contacts are projecting from the header. The header is heated to a temperature of about 500° C. and the sensor is then affixed to the header with the pins being inserted through the contact holes 35 in the contact glass, thus making electrical contact to the metallized areas of the sensor. The rest of the contact glass structure is affixed to the header by means of the Pyroceram layer. However, because the depression in the contact glass structure is in the area between the through holes, the contact glass is not affixed to the header in this area. Thus, when a pressure is applied to the tube 57, the pressure reaches the active portion of the silicon sensor 14, causing the sensor to deflect and thus giving an electrical signal. For a very large pressure however, the deflection is limited by the shallow cavity in the cover glass.

Figure 6:
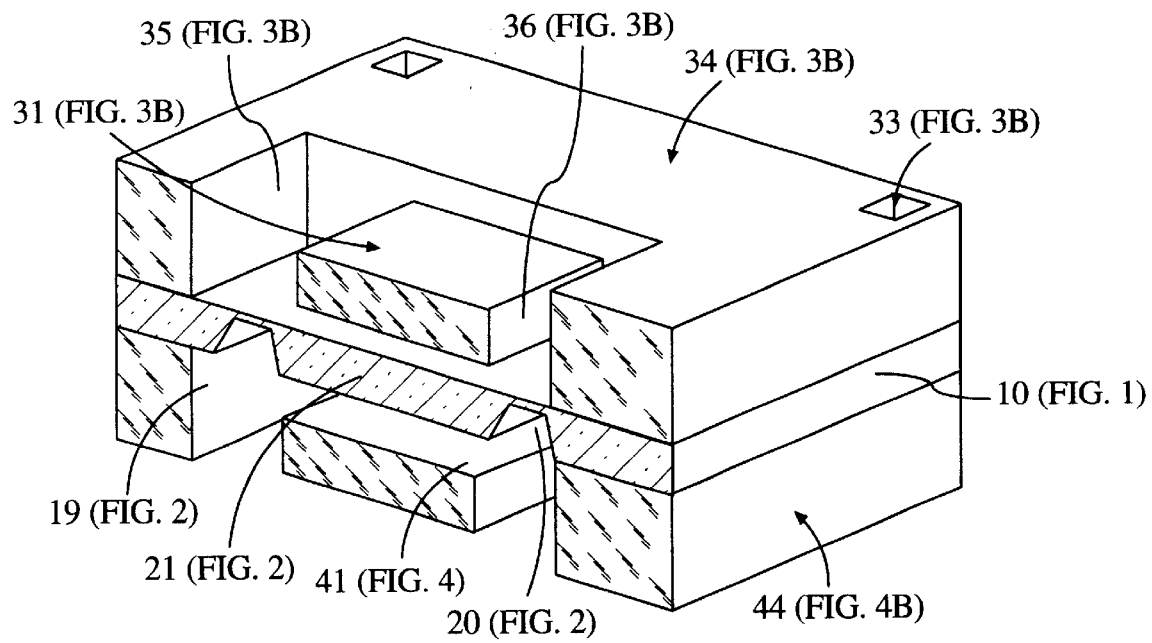
FIG. 6 shows a cross sectional view of the bonded wafer according to this invention showing the structure of FIG. 3 bonded to the structure of FIG. 1 bonded to the structure of FIG. 4.
Figure 7:
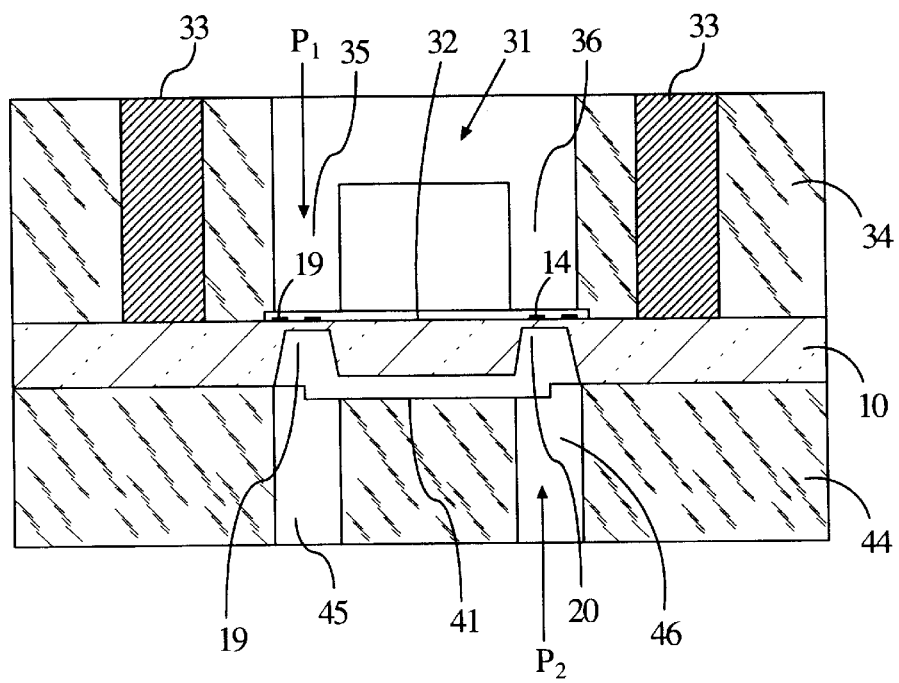
FIG. 7 is a front cross sectional view showing the three wafers bonded together.

The sensor is more clearly shown in the cross sectional view shown in FIG. 6 and FIG. 7. Basically, in FIG. 7 there is shown the through holes 33 filled with a conductive glass metal frit, as discussed above. It is seen that the contact glass member 34 is bonded to the silicon wafer 10, which in turn is bonded at the bottom surface to the cover glass member 44. It is seen that the apertures 45 and 46 in the cover glass member communicate with the bottom surfaces of the active areas of the web regions 19 and 20 of the sensor 10. On the other hand, a pressure can be applied to the top side where the apertures 35 and 36 communicate directly with the top surface of the sensors 14 mounted on the wafer 10. In this manner, the chip is capable of differential operation. As one can see, when a large force is applied to the top designated by arrow P1, the sensor wafer with the central boss 32 will impinge against the surface 41 of the member 44. On the other hand, when a force is applied in the direction of P2 and it is excessive, the top portion of the sensor will impinge against the surface 32 of the wafer 34. In this manner, the pressure sensor depicted in FIGS. 6 and 7 is stopped in both directions. The sensor is a leadless sensor having a unique configuration.

It should be apparent to those skilled in the art that the sensor configuration is amenable to alternate embodiments. It should also be apparent that the co-pending application Ser. No. 10/057,130 filed on Oct. 24, 2001 entitled, "Double Stopped Structure for a Pressure Transducer" is pertinent to the above-noted concepts and any alternate embodiments could be derived from either disclosure and the total disclosure of the above-noted co-pending application is incorporated herein in its entirety.

What is claimed is:

1. A leadless semiconductor sensor for measuring differential pressure across a diaphragm of the sensor and operable in the presence of an excessive unidirectional force applied to said diaphragm from either direction to stop said diaphragm from further deflection during the presence of said excessive force which otherwise would tend to fracture said diaphragm, comprising:

a semiconductor silicon wafer on which said sensor is fabricated, said wafer including a top surface having an active area surrounded by a p+ rim, said active area including p+ piezoresistors forming a Wheatstone Bridge array, said top surface further having p+ fingers each coupled to a respective one of said piezoresistors, with each p+ finger associated with a metal contact area for enabling an electrical connection to be made to an associated one of said piezoresistors, a first glass cover member having first and second slotted apertures in communication with said active area and having a central depression located between said apertures operative as a stop, said glass cover member bonded to a bottom surface of said wafer to enable a force to be applied to said bottom surface at said active regions through said slotted apertures, a second glass contact member having first and second slotted apertures in communication with said active area to enable a force to be applied to said top surface of said wafer through said slotted apertures of said second glass contact member, the second glass contact member further having a plurality of contact apertures each one congruent with and associated with one of said metal contact areas, said second glass contact member bonded to said top surface of said wafer at said p+ rim, said second glass contact member having a depression located between said slotted apertures to form a stop surface, wherein when an excessive force is applied to said wafer of said sensor through said slotted apertures in either direction, said first and second glass members stop said diaphragm from excessive deflection.

2. The semiconductor sensor of claim 1 wherein said first glass cover member is electrostatically bonded to said silicon sensor wafer.

3. The semiconductor sensor of claim 1 wherein said second glass member is electrostatically bonded to said silicon sensor wafer.

4. The semiconductor sensor of claim 1 wherein said plurality of contact apertures are each filled with a glass-metal frit.

5. The semiconductor sensor of claim 1 further including a header assembly having a mounting surface, a plurality of terminal areas located on said surface and coupled to terminal pins directed from the bottom of said surface, a central pressure receiving port located on said surface and coupled to a pressure receiving tube, said sensor mounted on said mounting surface with said second glass member secured to said mounting surface so that said contact apertures align with said terminal areas and said pressure port overlies the surface of said glass member between said slotted apertures and opposite said depression.

6. The sensor according to claim 1 wherein said first and second glass members are borosilicate glass.

7. The sensor according to claim 5 wherein said sensor is secured to said mounting surface by a glass bond.

8. The sensor according to claim 1 wherein said first glass member is typically from 0.010 to 0.020 inches thick.

9. The sensor according to claim 1 wherein said semiconductor wafer is typically from 0.003 to 0.020 inches thick.

10. The sensor according to claim 1 wherein said second glass member is typically from 0.010 to 0.020 inches thick.

* * * * *